June 2, 1964  D. R. FERRIS  3,135,495
THERMOSTATIC CONTROL VALVE
Filed Nov. 24, 1961  2 Sheets-Sheet 1
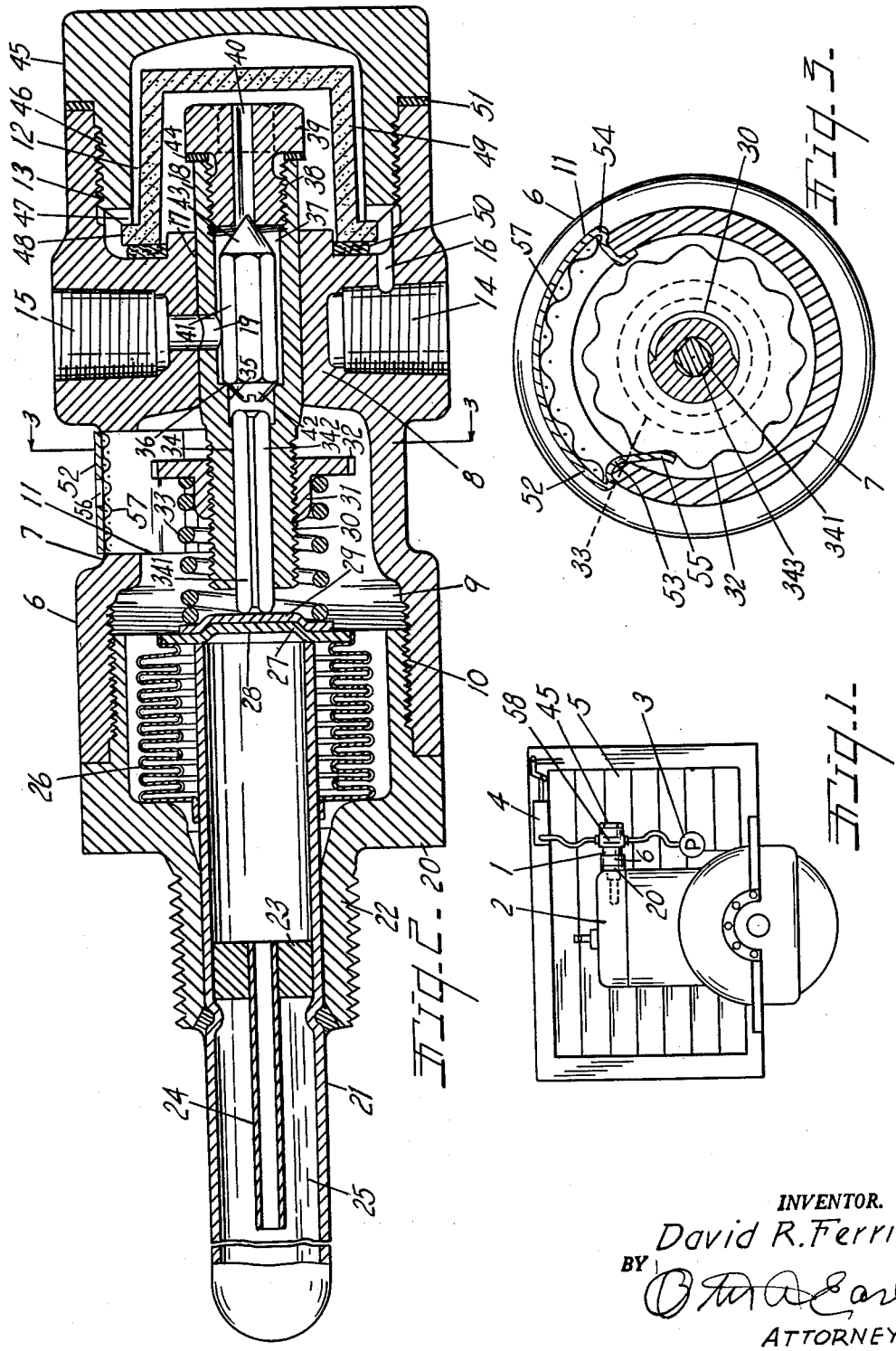
INVENTOR.
David R. Ferris
BY
ATTORNEY.

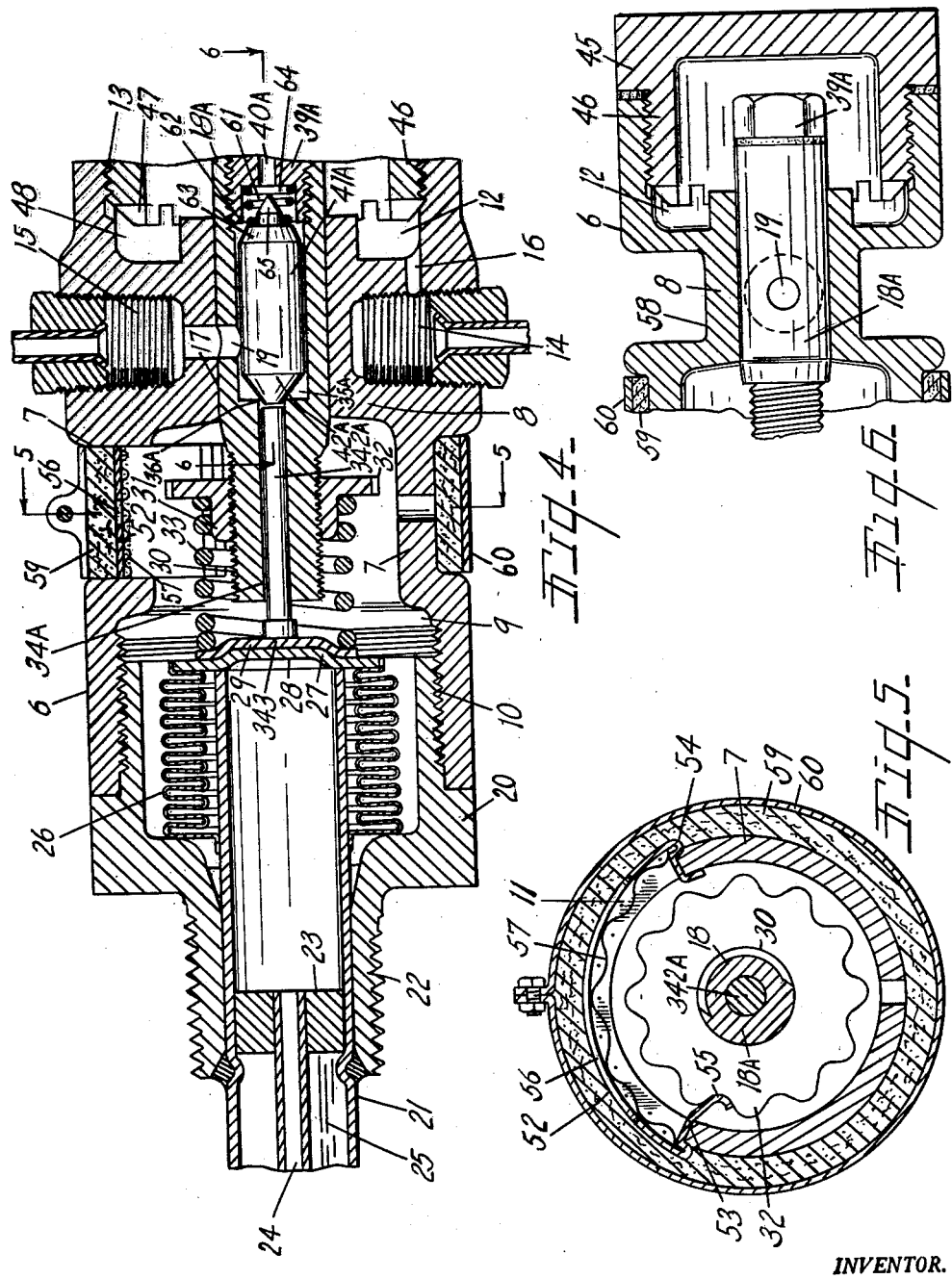

United States Patent Office 3,135,495
Patented June 2, 1964

3,135,495
THERMOSTATIC CONTROL VALVE
David R. Ferris, Cadillac, Mich., assignor to Kysor
Heater Company, Cadillac, Mich.
Filed Nov. 24, 1961, Ser. No. 154,652
1 Claim. (Cl. 251—366)

This invention relates to improvements in a thermostatic control valve body. The invention is an improvement on the valve structure disclosed in Patent No. 2,512,548, issued June 20, 1950 to Walter A. Kysor of the same title.

The principal objects of this invention are:

First, to provide a more compact valve for regulating the connecting of an abnormal pressure source to a fluid pressure motor in response to temperature changes and in which the connections to the motor and source are on opposite sides of the valve transverse to the axis of its thermostatic control element for easier installation and connection to an internal combustion engine.

Second, to provide a valve in which the major body elements are adapted for economical formation by casting and which are easily machineable and assembled into valve assemblies for regulating either super-atmospheric or sub-atmospheric pressures.

Other objects and advantages of the invention will be apparent from a consideration of the following description and claim. The drawings, of which there are two sheets, illustrate a highly practical form of the valve arranged for regulating super-atmospheric pressure and a modified form of the valve for sub-atmospheric operation.

FIG. 1 is a conventional rear end elevational view of an internal combustion engine and radiator shutter with the valve of the invention connected to regulate the shutter in response to engine temperature.

FIG. 2 is a fragmentary longitudinal cross sectional view through the valve assembly of FIG. 1 and arranged to control a super-atmospheric pressure.

FIG. 3 is a transverse cross sectional view taken along the plane of the line 3—3 in FIG. 2.

FIG. 4 is a fragmentary cross sectional view similar to FIG. 2 illustrating a modified form of the valve arranged to control a sub-atmospheric pressure.

FIG. 5 is a cross sectional view along the plane of the line 5—5 in FIG. 4.

FIG. 6 is an enlarged fragmentary cross sectional view taken along the plane of the line 6—6 in FIG. 4.

As appears conventionally in FIG. 1 the valve assembly 1 of the invention is adapted to be mounted on the block or head of an internal combustion engine 2 to sense the temperature in the cooling jacket of the engine. The valve, by means to be described, controls the admission of pressure, either super-atmospheric or sub-atmospheric, from a source such as the pump 3 operated by the engine to the pressure motor 4. The motor 4 operates the radiator shutter 5 to control the temperature in the cooling jacket of the engine.

The valve assembly consists of a generally cylindrical casting 6 having a portion 7 of reduced diameter and a transverse partition 8 of substantial thickness. One end of the body defines an axial recess 9 that is internally threaded at 10 and which opens into the reduced portion 7. The radially reduced portion defines a segmental arcuate opening 11. The recess 9 may be termed a thermostat recess. The other end of the body defines an axially opening filter recess 12 internally threaded at 13. The partition 8 defines oppositely opening threaded connections for a pressure opening 14 and a delivery opening 15. The pressure opening 14 connects toward its middle with an axially directed passage 16 opening to the outer periphery of the filter recess 12. The partition defines an axial bore 17 between the end recesses 9 and 12 which receives a tubular valve carrier 18 with a fixed press fit. The carrier defines a radial delivery port 19 opening to the outlet opening 15.

The first recess 9 may be termed a thermostat recess and receives the externally threaded collar 20 of a pressure tube 21. A neck 22 on the collar is externally threaded to fit in a tapped hole in the engine 2 with the closed outer end of the tube 21 projecting into the cooling jacket. The tube 21 has an internal plug 23 supporting the open ended gas tube 24 and a charge of vaporizable liquid 25 is retained in the outer end of the tube 21 from the plug.

As the liquid 25 is heated, gas is evolved and expands through the tube 24 into an expansible bellows 26 sealed over the inner end of the tube 21 in the thermostat recess. The inner end of the bellows 26 is closed by a plate 27 that seats against the inner end of the tube 21 to limit contraction of the bellows. The plate 27 is domed at 28 as a swivel bearing for the stainless steel thrust plate 29. The end of the valve carrier is externally threaded at 30 and adjustably supports an abutment collar 31 with an adjusting wheel serrated or notched on the edge as at 32. A spring 33 bears between the collar 31 and the thrust plate 29. The collar 31 is accessible through the opening 11 for adjustment.

The valve carrier 17 is bored, counter bored and tapped to provide a pin bore 34, a short enlarged bore 35 with a beveled annular seat 36 opening to the valve chamber 37 into which the port 19 opens. The thread 38 receives a screw plug 39 with an inlet bore 40 therethrough. A receiprocable valve element 41 in the chamber 37 has a tapered end 42 seating against the seat 36 and a conical end 43 seating alternatively to the end 42 in the inner end of the bore 40. The plug 39 is screwed into the thread 38 against the pressure of a gasket 44 until only a very short movement of the valve 41 is necessary to open at the seat 36 and close the inlet bore 40 and vice-versa. A push pin 341 in the bore 34 transmits thrust from the plate 29 to the valve element 41 and has flatted sides 342 and forming passages 343 for the free passage of air through the bore 34.

The filter recess is closed by a cap 45 having a cylindrical flange 46 notched or serrated at 47 at its inner end which bears against the flange 48 of a filter 49 of porous metal. The flange 46 and filter 49 press a gasket 50 against the bottom or inner end of the filter recess 12 but air is free to flow from the inlet 14 through the port 16, notches 47, inside of the cap 45 and through the filter 49 to the inlet bore 40. A final gasket 51 seals the rim of the valve body to the cap 45. The cylindrical porous metal filter thus has a broad effective filter area for high filter capacity and is easily removable by removing the cap 45 for washing in a solvent to clean the filter if it becomes clogged.

The adjusting opening 11 in the valve body is closed by a segmental flexible closure plate 52 (see FIG. 3) with a return bend hooked edge 53 engaging one edge of the opening 11 and an opposite edge 54 engaging the opposite edge of the opening. The edge 53 has an inturned ear 55 that engages the serrations 32 on the collar 31 to hold the valve in adjustment. A slot 56 permits free flow of air out of the thermostat recess and a screen 57 prevents entrance of dirt into the valve body.

In operation, the collar 31 is adjusted to the desired pressure in spring 33 corresponding to the pressure of gas from the liquid 25 at the desired temperature. The cap 52 is snapped in place with the ear 55 locking the collar 31 in adjusted position. Air pressure from the pump 3 enters the inlet 14 and port 16 passes through the notches 47 to be filtered by the filter 49. The thermostatic element 21 and bellows 26 being retracted when cold, the air pressure enters the inlet bore 40 unseating the pin 43 to permit pressure to pass through the delivery connections 19 and 15 to the motor 4 to hold the shutter 5 closed. When the valve element 41 opens at the point 43 it closes at seat 36 so the pressure does not escape. As the engine heats up in operation the liquid 25 boils increasing pressure in the bellows 26 until the preset bias of spring 33 is overcome. The push pin 341 then unseats the valve element 41 from the seat 36 and closes the port 40. Pressure in the motor 4 is then vented through the space 343 to the thermostat recess 9. The slot 56 in cap 52 permits air from the motor to escape to cause the shutter 5 to open.

The modification shown in FIGS. 4, 5 and 6 adapted for sub-atmospheric or vacuum pressures from the source 3 has the same cylindrical body 6 with the internal threaded thermostat recess 9 in one end. The thermostat recess receives the collar 20 of the heat sensing tube 21 and bellows 26. The bellows has a thrust plate 29 bearing against the spring 33.

The central partition portion 8 of the body 6 is externally flatted as at 58 to receive a wrench and defines the same radial delivery opening 15 and pressure opening 14 and a central axial bore 17. The bore 17 receives the press fitted, somewhat modified, tubular valve carrier 18A which projects into the thermostat recess 9 and is threaded to adjustably support the abutment wheel 32. The wheel 32 adjusts the compression on the spring 33 and is accessible through the arcuate opening 11 in the side of the thermostat chamber wall.

After the abutment wheel 32 is adjusted and the cover 52 pressed in place, a felt strip is wrapped around the reduced portion 7 of the body and retained by a clamp 60.

The valve carrier 18A is internally bored at 34A to loosely receive the push pin 342A which is positioned to be acted upon by the thrust plate 29. The bore 34A opens directly to the central valve chamber 35A with a sharp seat 36A around the junction of the bore and the chamber. The side of the valve carrier defines a radial delivery port 19 opening to the port 15. The chamber bore 35A loosely receives the modified double ended valve 41A with a first conical end 42A adapted to close on the seat 36A and be acted upon by the push pin 342A.

The opposite end of the valve carrier 18A projects into the internally threaded inlet recess 12 in the other end of the body 6 and is itself internally threaded to receive the inlet plug 39A. The plug 39A defines an inlet bore 40A opening into an enlarged counterbore 61. The bore 61 has a seat 62 around its inner end cooperative with the tapered shoulder 63 of the valve element. A valve spring 64 seats in the counterbore and around a guide projection 65 on the valve to bias the valve to open at the seat 62 against the action of suction on the valve. The same end cap 45 as in FIG. 1 closes the inlet chamber 12. Since the source of vacuum such as the pump P or the intake manifold of the engine draws air out of the chamber instead of forcing air into it as in FIG. 2, no filter is needed in this modification of the valve.

With the suction or vacuum source connected at 14 and the delivery port 15 connected to the shutter motor 4, the bellows 26 will be collapsed and retracted when the thermostatic element 21 is cold. In this condition, spring 64 opens the valve element at seat 62 and closes it at seat 36A. Vacuum is applied through ports and connections 14, 40A, 62 and around the valve body 41A to the ports 19, 15 and motor 4 to close the shutter 5. As the engine 2 heats up to selected operating temperature as determined by adjustment of the abutment wheel 32, pressure in the bellows 26 overcomes the pressure of spring 33 and pushes the rod 342A to unseat the valve 41A at seat 36A and close off the vacuum source at 62. Atmospheric pressure leaking through the felt 59 enters around the push pin 342A and valve 41A to break the vacuum at the air motor 4 and cause the shutter to open. In this respect, it is common to have the shutter spring biased to open position so that the system will "fail safe" in the event of failure of the motor 4.

It should be noted that in the positive pressure form of the valve shown in FIGS. 2 and 3, the supply port 40 is substantially smaller than the port 36 but that in the vacuum form of the valve shown in FIGS. 4, 5 and 6 the supply port at the seat 62 is of the same order as the size of the port 36A. This difference in relative sizes of the ports is provided by difference in the plugs 39 and 39A and the valve carriers 18 and 18A. The carriers and plugs are used interchangeably in the single form of the valve body 6. The body is small and easily applied to an engine and provides convenient supply and delivery connections on its sides where conduits can be attached most conveniently.

What is claimed as new is:

A valve body for thermostatically actuated valves comprising a generally cylindrical body with an integral transverse partition dividing said body into a thermostat recess and a filter recess at opposite ends of the body, said body being of radially reduced size and exteriorly flatted on two opposite sides of the outside of said partition to receive a wrench, said partition defining an axial bore centrally of said body adapted to receive a tubular valve carrier between said recesses, a tapped delivery opening formed in said body and one side of said partition between said flatted sides with a bore between the inner end of the opening and said axial bore, a tapped inlet opening formed in said body and an opposite side of said partition between said flatted sides and terminating in said partition short of said axial bore, an inlet passage formed in said partition axially of said body and opening between an interior portion of said inlet opening and the bottom of said filter recess at the radially outer edge of the filter recess, and a cap for said filter recess having a cylindrical flange threadedly received in said filter recess and extending to adjacent the bottom of the recess, the inner end of said flange defining apertures permitting air flow from said inlet passage exteriorly of said flange to the interior of the filter recess and the flange.

References Cited in the file of this patent

UNITED STATES PATENTS

| | | |
|---|---|---|
| 1,628,955 | De Pries | May 17, 1927 |
| 2,037,911 | Larson | Apr. 21, 1936 |
| 2,297,817 | Truxell et al. | Oct. 6, 1942 |
| 2,477,377 | Jones | July 26, 1949 |
| 2,512,548 | Kysor | June 20, 1950 |
| 2,829,837 | Willcox | Apr. 8, 1958 |